United States Patent [19]

Dibb et al.

[11] 3,992,315

[45] Nov. 16, 1976

[54] RECOVERY OF SURFACE ACTIVE GLYCOSIDES

[75] Inventors: Douglas N. Dibb, Salisbury, Rhodesia; John B. Barbour, Tanga, Tanzania

[73] Assignee: Omni Research Incorporated, San German, P.R.

[22] Filed: Aug. 20, 1974

[21] Appl. No.: 499,069

[30] Foreign Application Priority Data

Aug. 21, 1973  United Kingdom............... 39619/73

[52] U.S. Cl.............................. 252/182; 252/303;
  252/61; 252/307; 536/5
[51] Int. Cl.²...................... B01J 13/00; C07J 17/00
[58] Field of Search................... 252/307, 303, 8.05,
  252/61, 182; 260/209 R, 210.5

[56] References Cited
UNITED STATES PATENTS

| 2,301,787 | 11/1942 | Nord | 260/210.5 |
| 2,791,581 | 5/1957 | Wall et al. | 260/210.5 |
| 3,510,400 | 5/1970 | Loken et al. | 260/210.5 X |
| 3,620,919 | 11/1971 | Hardman | 260/210.5 X |
| 3,895,999 | 7/1975 | Loken | 260/210.5 X |

FOREIGN PATENTS OR APPLICATIONS 986,159   3/1965   United Kingdom

*Primary Examiner*—Benjamin R. Padgett
*Assistant Examiner*—E. Suzanne Parr
*Attorney, Agent, or Firm*—Fidelman, Wolffe & Waldron

[57] ABSTRACT

A process for concentrating and recovering water soluble glycosides from aqueous solution by foaming the solution, collecting the foam as a concentrated-in-glycoside product.

6 Claims, No Drawings

RECOVERY OF SURFACE ACTIVE GLYCOSIDES

This invention relates to a process for producing a concentrate of a surface active glycoside from plant material in which it occurs. In particular it relates to a process for producing a concentrate of a saponin. The invention is particularly useful in the production of hecogenin glycoside from *Agave sisalana* or other Agave species. Diogenin glycosides may also be successfully produced from *Dioscorea sylvatica* or other related Dioscorea species.

The glycosides produced by the process of the present invention are particularly useful as starting materials which are treated by known chemical methods to produce steroidal compounds which have valuable pharmaceutical uses. Hecogenin is a particularly useful starting material for many such compounds.

In known methods saponins are extracted from plant material by drying the material, and then dissolving it in large quantities of organic solvents such as ethanol or butanol. The solvent is subsequently removed by distillation and the saponin so obtained is hydrolyzed with boiling acid to give the derived sapogenin.

In an alternative method the plant material is ground up and boiled with an aqueous acid, filtered, washed, dried and subsequently the sapogenin is extracted with a suitable organic solvent such as ether or hexane.

In a known method of extracting hecogenin, juice is squeezed from decorticated sisal waste and allowed to stand for periods of up to one week in large tanks. During this period fermentation occurs which renders the hecogenin glycoside insoluble. In principle it can now be filtered, but owing to the physical nature of the material this has proved difficult. Many cumbersome and expensive techniques have been evolved to overcome this difficulty. Furthermore the fermentation process itself is difficult to control and prevent from proceeding too far, thus destroying the hecogenin.

The disadvantages of some of the known methods is that sapogenin usually occurs in very small amounts in various plant materials. Large quantities of expensive and potentially dangerous organic solvents have to be used for their recovery. Only a portion of the solvents can be recovered.

Large amounts of acid have to be used for the hydrolysis of the soluble saponin to insoluble sapogenin. These amounts are far in excess of that required for the chemical reaction, but are necessary because a certain concentration of acid must be maintained for the hydrolysis to take place in a reasonable time. The acid so used is not recoverable.

The process of the present invention enables very simple equipment to be used. Such equipment is much smaller than that otherwise required and hence much less expensive to install. The process also enables a continuous extraction method to be set up, and is therefore much easier to handle and avoids the use of very large reaction vessels and storage tanks.

The advantage of the present invention is that the saponin present in plant juice or extract may be concentrated by a factor of 10 to 50 times, by foaming the solution with a suitable gas. In this specification the expression "suitable gas" means any insoluble gas which will not react chemically with any materials of the process, including for example air, nitrogen and carbon dioxide. The saponin content of the plant juices are disproportionately present in the foam and recovery of the foam liquids provides a concentrated-in-saponin material.

A further advantage is that the concentrated saponin produced is readily separated from other non-surface active plant constituents which otherwise hinder final purification stages. In the known processes employed such other plant constituents often make separation very difficult, if not impossible, filtration of slimy plant extracts, for example. In prior art procedures various chemical agents have had to be added to render the material amenable to handling, e.g. addition of a phenol to the sisal juice as disclosed in U.S. Pat. No. 3,010,955.

According to practice of this invention, the process for producing a concentrate of a surface active glycoside from a plant material in which it occurs includes the steps of forming an aqueous solution of the glycoside from the material, causing a foam to form on the surface of the solution, collecting the foam, and collapsing the foam to form the concentrate. Sometimes an appropriate solution is already available, as for example decorticated sisal waste fluids.

Preferably the foam is formed by passing a suitable gas through the solution.

According to one aspect of the invention, the plant material is expressed to form the aqueous solution.

In an alternative form of the invention the plant material is comminuted prior to being treated with water to form the aqueous solution. In this aspect of the invention the water is preferably heated to about 70° C. and agitated.

In a preferred form of the invention the gas is compressed air.

The concentrated solution of the glycoside may be hydrolyzed by acid in the known manner to give the corresponding (insoluble) glycogen or sapogenin. For example, hydrolysis of the concentrate of hecogenin glycoside produced in accordance with the present invention by an acid results in the precipitation of the hecogenin.

The invention will now be described by reference to the accompanying examples.

EXAMPLE 1

One hundred liters of juice obtained by passing freshly cut leaves of *Agave sisalana* through a roller press were placed in a vertical cylindrical container. A slow stream of air was introduced through a sparger, entering the bottom of the container, thus causing a foam to be formed above the liquid. The rate of introduction of air was increased until the foam overflowed slowly through a "U" tube attached to the top of the cylinder into another cylinder. When no further foam passed over, the air stream was shut off. On standing for several hours the collected foam collapsed to a liquid with a volume of 8.3 liters. Analysis of this liquid by standard techniques showed that it contained 97% of the hecogenin glycosides present in the original 100 liters of juice.

EXAMPLE 2

Juice was obtained by passing sisal waste from the industrial decortication process of *Agave sisalana* leaves through a screw press. The juice was treated in the same manner as that described in EXAMPLE 1.

EXAMPLE 3

Fresh tubers of a plant *Dioscorea sylvatica* known to contain diosgenin glycosides were ground to a slurry with three times their weight of hot water. This slurry was placed in a vertical cylindrical vessel and a stream of nitrogen gas was introduced through a sparger at the bottom of the vessel. The rate of introduction of the nitrogen was increased until the foam formed on top of the liquid overflowed slowly into an outer container in which the original cylinder was placed. When no further froth was obtained the nitrogen supply was cut off. The foam, which proved to be particularly stable in this instance, was collapsed by addition of a little dilute hydrochloric acid and mechanical agitation. The final volume of liquid containing substantially all of the diosgenin glycosides was about one twentieth of the original slurry.

EXAMPLE 4

Freshly picked green fruits off *Solanum khasianum* (5 kg.) known to contain 3.2% of solasodine in the form of the soluble glycosides in the pulp surrounding the pips, were cut into quarters, placed in a suitable vessel and covered with 25 liters of water. The whole mass was heated to 70° C. and stirred for two hours. A supernatant liquid was decanted through a fine sieve, and subsequently foamed in the manner described in Example 3. There was obtained collapsed foam (2.3 liters) which was shown to contain 82% of the solasodine originally present in the fruits, and 96% of that contained in the aqueous extract.

EXAMPLE 5

Slurry of sisal waste and water produced during the industrial decortication of sisal leaves for the extraction of sisal fibre was pumped continuously to the upper portion of a vertical steel pipe 3 meters high and 0.5 meters in diameter. Simultaneously a continuous stream of compressed air was introduced into the bottom of the said pipe through a very finely perforated plate. The hecogenin glycosides present in the slurry of waste material was absorbed on the surface of the rising bubbles and carried into the foam above the liquid surface. The rate of introduction of air was controlled so that a continuous stream of foam was carried over through a suitably arranged pipe and fell into an adjacent vessel containing re-fluxing dilute sulphuric acid. Under these conditions the foam was rapidly broken and the contact with hot acid hydrolyzed the glycosidic link of the water soluble hecogenin glycosides leading to the precipitation of an insoluble hecogenin.

At the end of each day's decortication (or more frequently if necessary) this precipitated crude hecogenin was filtered or centrifuged to separate the waste liquid, washed with water and dilute aqueous alkali to remove adhering acid, and dried. Material so obtained in the form of a dark brown granular solid which contains upward of 20% pure hecogenin in contrast to 0.1% of hecogenin present in the original sisal waste.

The liquid slurry through which air has been bubbled is continuously removed at the base of the pipe mentioned above. If desired this can be pumped through a second column and re-foamed to remove additional quantities of crude hecogenin glycoside.

What is claimed:

1. A process for concentrating and recovering water soluble steroidal glycosides of plant materials from an aqueous mixture containing the glycosides in solution which comprises foaming the aqueous mixture with an insoluble gas which will not react chemically with the aqueous mixture, separating out the foam from the mixture, the glycoside content of the mixture being concentrated in the foam and thereafter hydrolyzing the glycoside so recovered.

2. The process of claim 1 wherein the aqueous mixture comprises agave plant juices.

3. The process of claim 1 wherein glycoside containing mixture is solid form plant material admixed with water to form the aqueous mixture.

4. The process of claim 3 wherein the aqueous mixture is a slurry of ground Dioscorea tubers.

5. The process of claim 1 wherein the separated foam product is thereafter acid hydrolyzed to produce a glycogen therefrom.

6. A process for concentrating and recovering water soluble steroidal glycosides of agave plant juices from an aqueous mixture containing the glycosides in solution which comprises foaming the aqueous mixture with air, then separating the foam from the mixture, the glycoside content of the mixture being concentrated in the foam, and thereafter hydrolyzing the glycoside so recovered.

* * * * *